(12) United States Patent
Moore et al.

(10) Patent No.: US 10,826,344 B2
(45) Date of Patent: Nov. 3, 2020

(54) HIGH SPEED ELECTRIC MACHINE WITH EMBEDDED ROTOR MAGNETS

(71) Applicant: General Electric Company, Schenectady, NY (US)

(72) Inventors: Nicholas Taylor Moore, Cincinnati, OH (US); Daniel Alan Niergarth, Cincinnati, OH (US); Paul Robert Gemin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 15/354,422

(22) Filed: Nov. 17, 2016

(65) Prior Publication Data

US 2018/0138767 A1     May 17, 2018

(51) Int. Cl.
| | |
|---|---|
| *H02K 1/27* | (2006.01) |
| *H02K 21/24* | (2006.01) |
| *B64D 27/18* | (2006.01) |
| *H02K 1/16* | (2006.01) |
| *H02K 7/14* | (2006.01) |
| *H02K 7/18* | (2006.01) |

(52) U.S. Cl.
CPC .......... *H02K 1/2793* (2013.01); *B64D 27/18* (2013.01); *H02K 1/16* (2013.01); *H02K 1/2706* (2013.01); *H02K 7/14* (2013.01); *H02K 7/1823* (2013.01); *H02K 21/24* (2013.01); *H02K 1/276* (2013.01); *H02K 1/2753* (2013.01); *H02K 2213/03* (2013.01)

(58) Field of Classification Search
CPC ...... H02K 1/16; H02K 1/2706; H02K 1/2793; H02K 7/14; H02K 7/1823; H02K 21/24; H02K 2213/03; H02K 1/182; H02K 21/026

USPC ............................ 310/112, 114, 156.32, 268
See application file for complete search history.

(56) References Cited

U.S. PATENT DOCUMENTS

| | | |
|---|---|---|
| 1,936,737 A | 11/1933 | Tingley |
| 2,039,199 A | 4/1936 | Swendsen |
| 4,187,441 A | 2/1980 | Oney |
| 4,324,996 A | 4/1982 | Adelski et al. |
| 4,634,191 A | 1/1987 | Studer |
| 5,115,173 A | 5/1992 | Kobayashi et al. |
| 6,225,724 B1 | 5/2001 | Toide et al. |
| 6,509,666 B1 | 1/2003 | Huang et al. |
| 6,583,528 B2 | 6/2003 | Gabrys |

(Continued)

FOREIGN PATENT DOCUMENTS

JP     2010-017009 A     1/2010

OTHER PUBLICATIONS

International Search Report and Written Opinion issued in connection with corresponding PCT Application No. PCT/US2017/056844 dated Jan. 26, 2018.

(Continued)

*Primary Examiner* — Jue Zhang
*Assistant Examiner* — David A. Singh
(74) *Attorney, Agent, or Firm* — Dority & Manning, P.A.

(57) ABSTRACT

An electric machine is provided which includes a rotor disk extending along a radial direction and a having a rotor magnet embedded within the rotor disk. The electric machine further includes a stator assembly in axial or radial magnetic flux communication with the rotor magnets to generate a torque.

20 Claims, 10 Drawing Sheets

(56) References Cited

U.S. PATENT DOCUMENTS

| | | | |
|---|---|---|---|
| 6,720,688 B1* | 4/2004 | Schiller | H02K 1/2793 |
| | | | 310/266 |
| 6,856,051 B2 | 2/2005 | Reiter, Jr. et al. | |
| 6,888,270 B2 | 5/2005 | Reiter, Jr. et al. | |
| 6,940,200 B2 | 9/2005 | Lopatinsky et al. | |
| 7,521,832 B2 | 4/2009 | Tajima et al. | |
| 7,942,646 B2 | 5/2011 | Zhou et al. | |
| 8,294,404 B2 | 10/2012 | Stiesdal et al. | |
| 8,362,731 B2 | 1/2013 | Smith et al. | |
| 8,536,752 B2 | 9/2013 | Katsumata et al. | |
| 8,786,151 B1 | 7/2014 | Cole et al. | |
| 9,257,890 B2 | 2/2016 | Erd et al. | |
| 2006/0131986 A1* | 6/2006 | Hsu | H02K 21/24 |
| | | | 310/268 |
| 2006/0273676 A1* | 12/2006 | Naruse | H02K 21/24 |
| | | | 310/156.32 |
| 2006/0284507 A1* | 12/2006 | Murakami | H02K 1/2793 |
| | | | 310/156.37 |
| 2009/0200883 A1* | 8/2009 | Halstead | H02K 7/09 |
| | | | 310/90.5 |
| 2009/0302717 A1 | 12/2009 | Hoffman | |
| 2010/0101074 A1* | 4/2010 | Halstead | H02K 3/04 |
| | | | 29/596 |
| 2011/0241460 A1* | 10/2011 | Mebarki | H02K 1/20 |
| | | | 310/64 |
| 2011/0285254 A1* | 11/2011 | Bales | H02K 1/141 |
| | | | 310/68 B |
| 2013/0009508 A1* | 1/2013 | Takamatsu | H02K 21/46 |
| | | | 310/156.35 |
| 2013/0062984 A1 | 3/2013 | Tremelling | |
| 2014/0035423 A1 | 2/2014 | Veronesi et al. | |
| 2014/0246864 A1 | 9/2014 | McCormick | |
| 2014/0262524 A1 | 9/2014 | Valliyappan et al. | |
| 2015/0171721 A1 | 6/2015 | Seo et al. | |
| 2015/0380999 A1 | 12/2015 | Joshi et al. | |
| 2016/0043606 A1 | 2/2016 | Chase | |
| 2016/0238011 A1* | 8/2016 | Lambert | H02K 1/148 |
| 2016/0329795 A1 | 11/2016 | Ricci et al. | |
| 2017/0335795 A1* | 11/2017 | Klemen | F02K 3/06 |

OTHER PUBLICATIONS

Oh et al., Axial Flux Variable Gap Motor: Application in Vehicle Systems, Argonne National Laboratory, http://www.autonomie.net/docs/6%20%20Papers/CIL/axial_flux_variable_gap_motor.pdf, 2002-10-1088.

Misra, Nano-Magnets and Additive Manufacturing for Electric Motors, NASA Glenn Research Center, http://ntrs.nasa.gov/archive/nasa/casi.ntrs.nasa.gov/20140010481.pdf, Apr. 25, 26, 2014, Santa Rosa CA, pp. 1-21.

Mahmoudi et al, Axial-flux permanent-magnet machine modeling, design, simulation and analysis, Scientific Research and Essays, www.academicjournals.org/journal/SRE/article-full-text-pdf/A6B960823151, vol. 6(12), Jun. 18, 2011, pp. 2525-2549.

* cited by examiner

HIGH SPEED ELECTRIC MACHINE WITH EMBEDDED ROTOR MAGNETS

FIELD

The present subject matter relates generally to an electric machine, and more particularly, to a high speed electric machine.

BACKGROUND

Electric machines, e.g., electric motors and generators, are used in a variety of industries to convert electrical energy to mechanical energy, and vice versa, for useful purposes. For example electric machines are used in the automotive, aviation, maritime, and other industries to operate aircrafts, helicopters, automobiles, boats, submarines, trains, and/or any other suitable vehicles.

To reduce fuel consumption and improve propulsive efficiency, it is generally desirable to use electric machines with large power densities, referred to herein as the electric machine's specific power or power-to-weight ratio. Electric machines having a high specific power may be smaller and more lightweight while generating equivalent or greater power than heavier electric machines.

Increasing the rotation speeds of electric machines is known to increase power-to-weight ratios. However, as the rotational speeds increase, the stresses on the various rotating components of the electric machine also increase. As a result the retaining structure for holding the rotating components of the electric machine must be larger and heavier, thus increasing costs, size, and weight. For example, certain electric machines use a disk retaining structure which allows for much higher tip speeds and power densities than conventional machines. However, as the rotor disk experiences large centrifugal forces during high speed operation, the stresses exerted on rotor disk by the rotor components may limit the ability of the electric machine to reach higher speeds.

In addition, conventional disk architectures for electric machines utilize two rotor magnets positioned on either side of a rotor disk. A stator assembly is positioned adjacent each rotor magnet such that the magnetic flux passes from one stator assembly, through both rotor magnets and the rotor disk, to the other stator assembly. Such a construction necessitates thicker magnets to maintain the flux and a larger rotor disk to support the magnets. Alternatively, rotor back irons may be used on each side of the rotor disk to return the magnetic flux to each respective stator assembly. Both constructions result in additional costs, size, and weight.

Accordingly, an electric machine with features for improving specific power and efficiency is desirable. More specifically, an electric machine with features for enabling improved utilization of magnetic flux and high speed operation of the electric machine to improve performance and specific power would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an electric machine defining an axial direction, a radial direction, and a circumferential direction is provided. The electric machine includes a stator assembly and a rotor disk rotatable about the axial direction relative to the stator assembly. The rotor disk includes a rotor magnet embedded therein and operable with the stator assembly to produce a torque, the rotor magnet of the rotor disk spaced from the stator assembly along the axial direction of the electric machine to generate an axial flux across an airgap.

In another exemplary embodiment of the present disclosure, an electric machine configured for driving an aeronautical propulsion device for an aircraft is provided. The electric machine includes a drive shaft mechanically coupled to the boundary layer ingestion fan and defining an axial direction and a radial direction and a rotor disk mounted to the drive shaft and being rotatable about the axial direction. A rotor magnet is embedded within the rotor disk and a stator assembly is operable with the rotor magnet to produce a torque.

According to yet another exemplary embodiment of the present subject matter, an electric machine defining an axial direction, a radial direction, and a circumferential direction is provided. The electric machine includes a stator assembly and a rotor disk rotatable about the axial direction relative to the stator assembly, the rotor disk extending to a position adjacent to the stator assembly along the axial direction or outward of the stator assembly along the radial direction. The rotor disk includes a rotor magnet embedded therein and is operable with the stator assembly to produce a torque.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
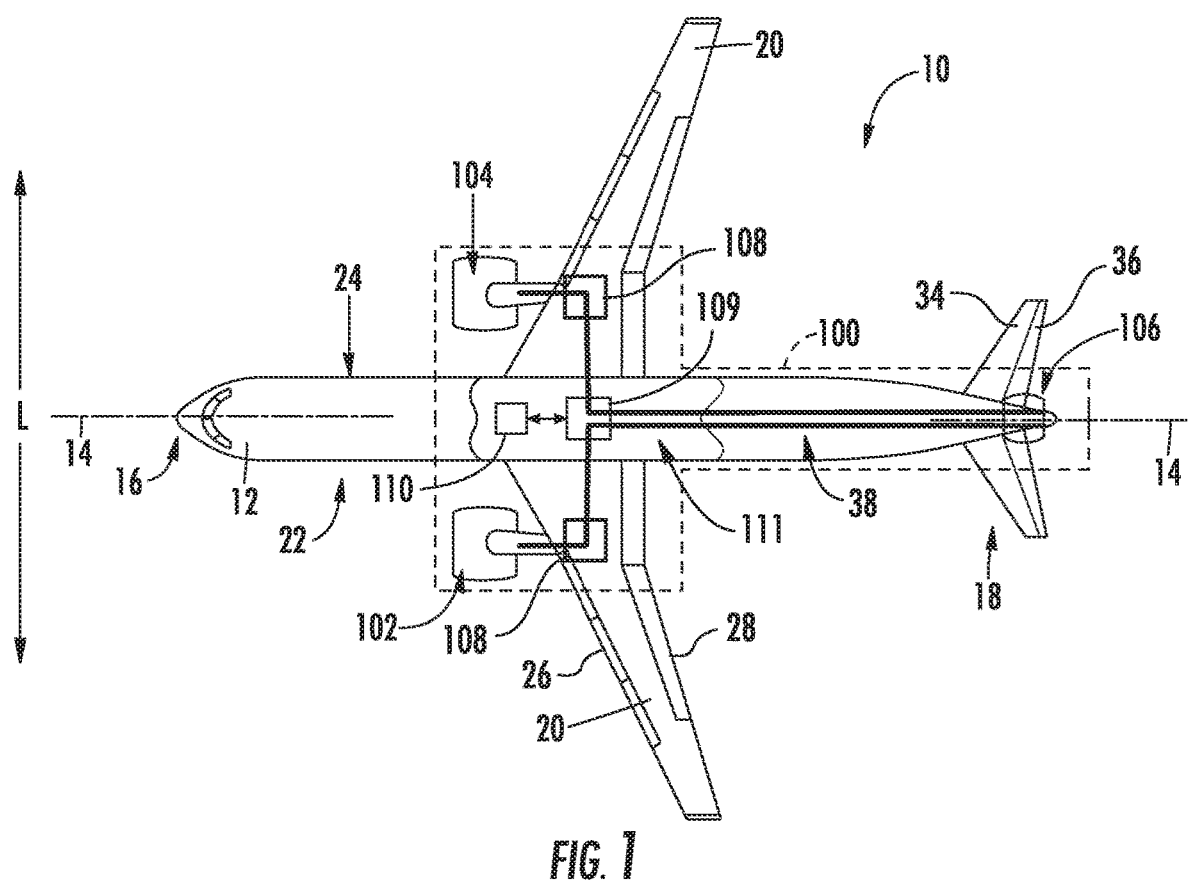
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
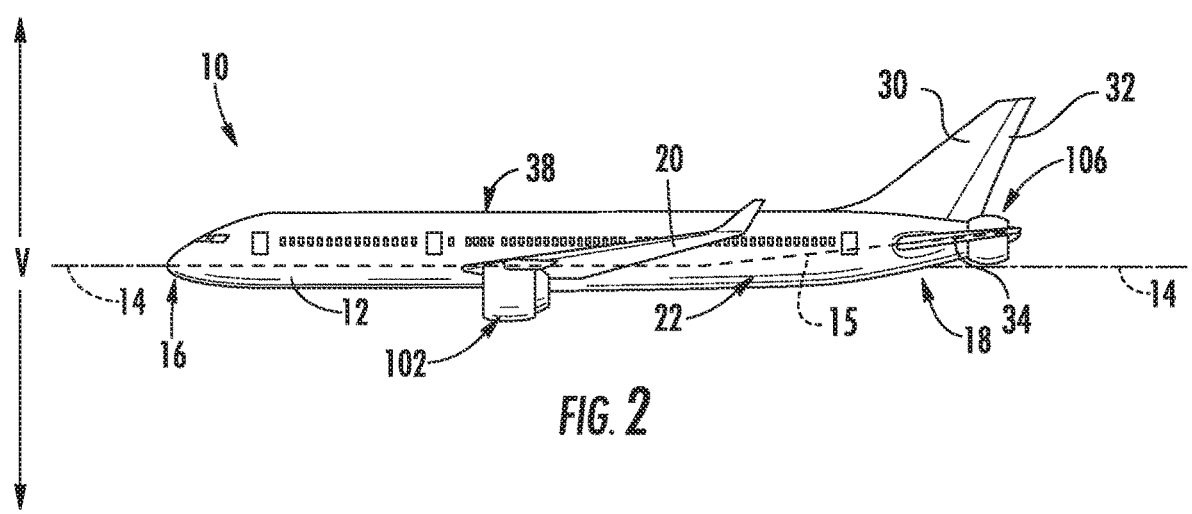
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes one or more aircraft engines and one or more electric propulsion engines. For example, the embodiment depicted includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion engine is configured to be mounted at the aft end of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line 15 extends therethrough. It should be appreciated, however, that in other embodiments the electric propulsion engine may be configured in any other suitable manner, and may not necessarily be configured as an aft fan or as a BLI fan.

Referring still to the embodiment of FIGS. 1 and 2, in certain embodiments the propulsion system further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device 110. The electric generators 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all are connected to an electric communication bus 111, such that the electric generator 108 may be in electrical communication with the BLI fan 106 and/or the energy storage device 110, and such that the electric generator 108 may provide electrical power to one or both of the energy storage device 110 or the BLI fan 106. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the BLI fan 106 may alternatively be positioned at any suitable location proximate the aft end 18 of the aircraft 10. Further, in still other embodiments the electric propulsion engine may not be positioned at the aft end of the aircraft 10, and thus may not be configured as an "aft engine." For example, in other embodiments, the electric propulsion engine may be incorporated into the fuselage of the aircraft 10, and thus configured as a "podded engine," or pod-installation engine. Further, in still other embodiments, the electric propulsion engine may be incorporated into a wing of the aircraft 10, and thus may be configured as a "blended wing engine." Moreover, in other embodiments, the electric propulsion engine may not be a boundary layer ingestion fan, and instead may be mounted at any suitable location on the aircraft 10 as a freestream injection fan. Furthermore, in still other embodiments, the propulsion system 100 may not include, e.g., the power conditioner 109 and/or the energy storage device 110, and instead the generator(s) 108 may be directly connected to the BLI fan 106.

Figure 3:
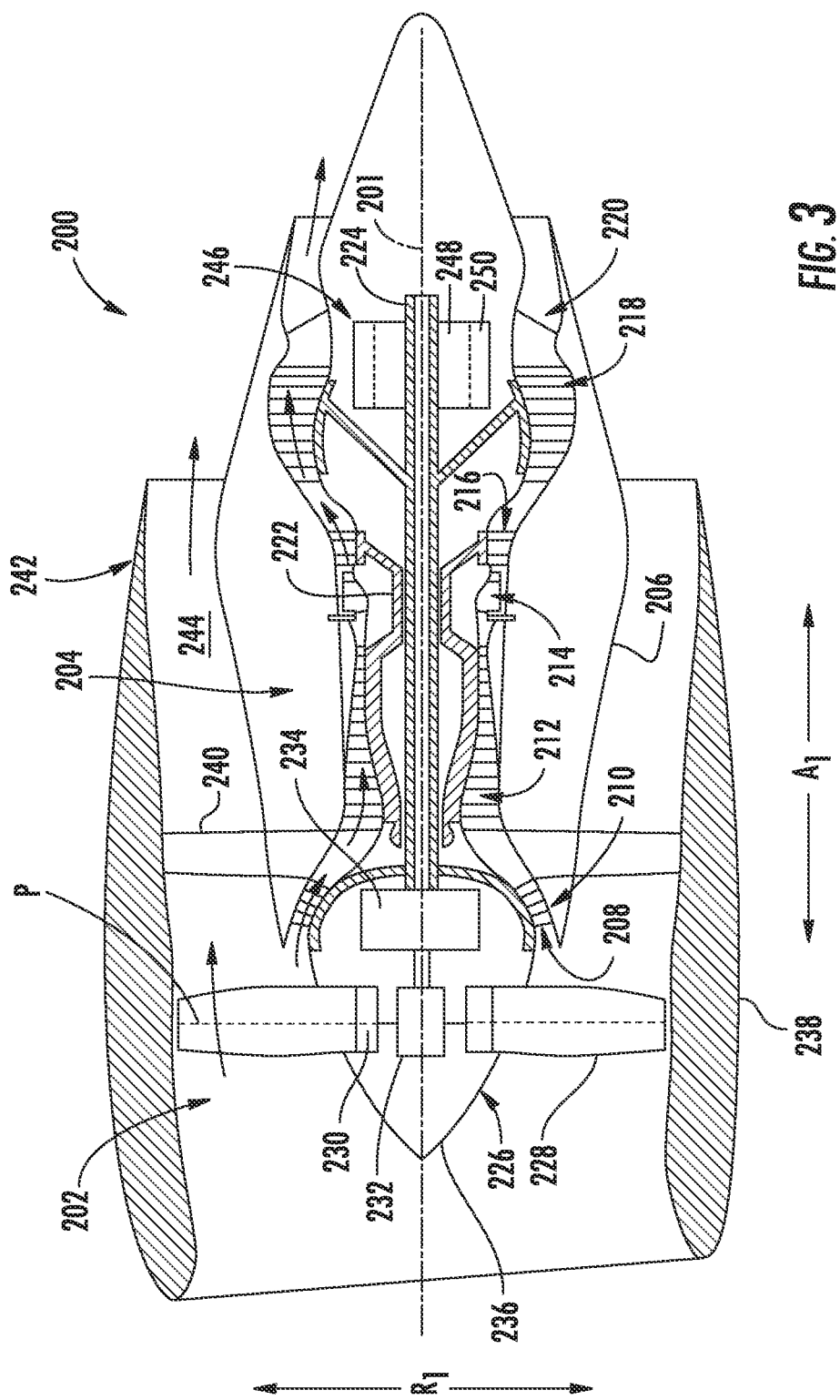
FIG. 3 is a schematic, cross-sectional view of a gas turbine engine mounted to the exemplary aircraft of FIG. 1.

Referring now to FIG. 3, a schematic cross-sectional view of a propulsion engine in accordance with an exemplary embodiment of the present disclosure is provided. In certain exemplary embodiments, the propulsion engine may be configured a high-bypass turbofan jet engine 200, herein referred to as "turbofan 200." Notably, in at least certain embodiments, the jet engines 102, 104 may be also configured as high-bypass turbofan jet engines. In various embodiments, the turbofan 200 may be representative of jet engines 102, 104. Alternatively, however, in other embodiments, the turbofan 200 may be incorporated into any other suitable aircraft 10 or propulsion system 100.

As shown in FIG. 3, the turbofan 200 defines an axial direction A1 (extending parallel to a longitudinal centerline 201 provided for reference) and a radial direction R1. In general, the turbofan 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R1. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. It should be appreciated that the nacelle 238 may be configured to be supported relative to the core turbine engine 204 by a plurality of circumferentially-spaced outlet guide vanes 240. Moreover, a downstream section 242 of the nacelle 238 may extend over an outer portion of the core turbine engine 204 so as to define a bypass airflow passage 244 therebetween.

Additionally, the exemplary turbofan 200 depicted includes an electric machine 246 rotatable with the fan 226. Specifically, for the embodiment depicted, the electric machine 246 is configured as an electric generator co-axially mounted to and rotatable by the LP shaft 224 (the LP shaft 224 also rotating the fan 226 through, for the embodiment depicted, the power gearbox 234). The electric machine 246 includes a rotor 248 and a stator 250. In certain exemplary embodiments, the rotor 248 and stator 250 of the electric machine 246 are configured in substantially the same manner as the exemplary rotor and stator of the electric motor 336 described below with reference to FIG. 4 or the electric machine 350 described below with reference to FIGS. 5 through 9. Additionally, as will be appreciated, the rotor 248 may be attached to the LP shaft 224 and the stator 250 may remain static within the core turbine engine 204. During operation, the electric machine may define an electric machine tip speed (i.e., a linear speed of the rotor 248 at an airgap radius of electric machine 246, as described below). Notably, when the turbofan engine 200 is integrated into the propulsion system 100 described above with reference to FIGS. 1 and 2, the electric generators 108 may be configured in substantially the same manner as the electric machine 246 of FIG. 3.

It should also be appreciated, however, that the exemplary turbofan engine 200 depicted in FIG. 3 is by way of example only, and that in other exemplary embodiments, the turbofan engine 200 may have any other suitable configuration. For example, although rotor 248 is illustrated as being attached to the LP shaft 224, it should be appreciated that rotor 248 could alternatively be attached to the HP shaft 222 or any other suitable shaft. Further, it should be appreciated, that in other exemplary embodiments, the jet engines 102, 104 may instead be configured as any other suitable aeronautical engine, such as a turboprop engine, turbojet engine, internal combustion engine, etc.

Figure 4:
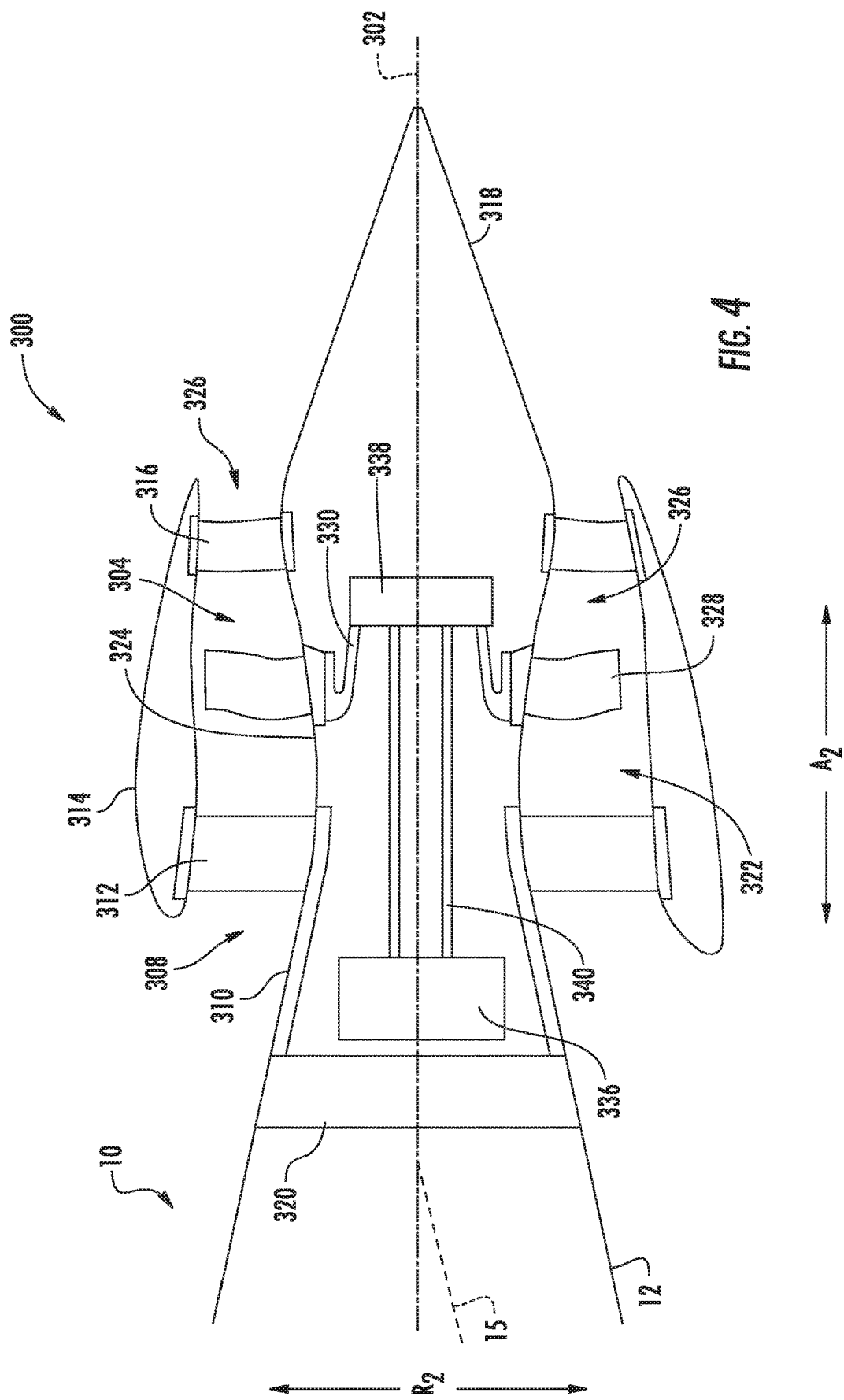
FIG. 4 is a schematic, cross-sectional view of an aft engine in accordance with an exemplary embodiment of the present disclosure.

Referring now to FIG. 4, a schematic, cross-sectional side view of an electric propulsion engine in accordance with various embodiments of the present disclosure is provided. The electric propulsion engine depicted is mounted to an aircraft 10 at an aft end 18 of the aircraft 10 and is configured to ingest a boundary layer air. Accordingly, for the embodiment depicted, the electric propulsion engine is configured as a boundary layer ingestion (BLI), aft fan (referred to hereinafter as "BLI fan 300"). The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2.

As shown in FIG. 4, the BLI fan 300 defines an axial direction A2 extending along a longitudinal centerline axis 302 (or center axis) that extends therethrough for reference, as well as a radial direction R2 and a circumferential direction C2 (a direction extending about the axial direction A2, not shown). Additionally, the aircraft 10 defines a mean line 15 extending therethrough.

In general, the BLI fan 300 includes a fan 304 rotatable about the centerline axis 302 and a structural support system 308. The structural support system 308 is configured for mounting the BLI fan 300 to the aircraft 10, and for the embodiment depicted generally includes an inner frame support 310, a plurality of forward support members 312, an outer nacelle 314, a plurality of aft support members 316, and a tail cone 318. As is depicted, the inner frame support 310 is attached to a bulkhead 320 of the fuselage 12. The plurality of forward support members 312 are attached to the inner frame support 310 and extend outward generally along the radial direction R2 to the nacelle 314. The nacelle 314 defines an airflow passage 322 with an inner casing 324 of the BLI fan 300, and at least partially surrounds the fan 304. Further, for the embodiment depicted, the nacelle 314 extends substantially three hundred and sixty degrees (360°) around the mean line 15 of the aircraft 10. The plurality of aft support members 316 also extend generally along the radial direction R2 from, and structurally connect, the nacelle 314 to the tail cone 318.

In certain embodiments, the forward support members 312 and the aft support members 316 may each be generally spaced along the circumferential direction C2 of the BLI fan 300. Additionally, in certain embodiments the forward support members 312 may be generally configured as inlet guide vanes and the aft support members 316 may generally be configured as outlet guide vanes. If configured in such a manner, the forward and aft support members 312, 316 may direct and/or condition an airflow through the airflow passage 322 of the BLI fan 300. Notably, one or both of the forward support members 312 or aft support members 316 may additionally be configured as variable guide vanes. For example, the support member may include a flap (not shown) positioned at an aft end of the support member for directing a flow of air across the support member.

It should be appreciated, however, that in other exemplary embodiments, the structural support system 308 may instead include any other suitable configuration and, e.g., may not include each of the components depicted and described above. Alternatively, the structural support system 308 may include any other suitable components not depicted or described above.

The BLI fan 300 additionally defines a nozzle 326 between the nacelle 314 and the tail cone 318. The nozzle 326 may be configured to generate an amount of thrust from the air flowing therethrough, and the tail cone 318 may be shaped to minimize an amount of drag on the BLI fan 300. However, in other embodiments, the tail cone 318 may have any other shape and may, e.g., end forward of an aft end of the nacelle 314 such that the tail cone 318 is enclosed by the nacelle 314 at an aft end. Additionally, in other embodiments, the BLI fan 300 may not be configured to generate any measurable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring still to FIG. 4, the fan 304 includes a plurality of fan blades 328 and a fan shaft 330. The plurality of fan blades 328 are attached to the fan shaft 330 and spaced generally along the circumferential direction C2 of the BLI fan 300. As depicted, the plurality fan blades 328 are, for the embodiment depicted, at least partially enclosed by the nacelle 314.

Moreover, for the embodiment depicted, the fan 304 is rotatable about the centerline axis 302 of the BLI fan 300 by an electric machine. More particularly, for the embodiment depicted, the electric machine is configured as an electric motor 336 and the BLI fan 300 additionally includes a power gearbox 338 mechanically coupled to the electric motor 336. Additionally, the fan 304 is mechanically coupled to the power gearbox 338. For example, for the embodiment depicted, the fan shaft 330 extends to and is coupled to the power gearbox 338, and a driveshaft 340 of the electric motor 336 extends to and is also coupled to the power gearbox 338. Accordingly, for the embodiment depicted, the fan 304 is rotatable about the central axis 302 of the BLI fan 300 by the electric motor 336 through the power gearbox 338.

The power gearbox 338 may include any type of gearing system for altering a rotational speed between the driveshaft 340 and the fan shaft 330. For example, the power gearbox 338 may be configured as a star gear train, a planetary gear train, or any other suitable gear train configuration. Additionally, the power gearbox 338 may define a gear ratio, which as used herein, refers to a ratio of a rotational speed of the driveshaft 340 to a rotational speed of the fan shaft 330. In certain exemplary embodiments, the gear ratio of the power gearbox 338 may be greater than about 1:1 and less than about 1:5. For example, in certain embodiments, the gear ratio of the power gearbox 338 may be between about 1:1.5 and about 1:3.5, such as between about 1:1.2 and about 1:2.75. It should be appreciated, that as used herein, terms of approximation, such as "about" or "approximately," refer to being within a 10% margin of error.

Referring still to the exemplary embodiment of FIG. 4, the electric motor 336 is located at least partially within the fuselage 12 of the aircraft 10. More specifically, the fan 304 is positioned forward of the power gearbox 338 along the central axis 302 of the BLI fan 300, and the electric motor 336 is positioned forward of the fan 304 along the central axis 302 of the BLI fan 300. However, according to alternative embodiments, power gearbox 338 could be positioned at a forward location or at any other suitable location within aircraft 10.

Further, in certain exemplary embodiments, the BLI fan 300 may be configured with a gas-electric propulsion system, such as the gas-electric propulsion system 100 described above with reference to FIGS. 1 and 2. In such an embodiment, the electric motor 336 may receive power from one or both of an energy storage device or an electric generator—such as the energy storage device 110 or electric generator 108 of FIGS. 1 and 2.

Figure 5:
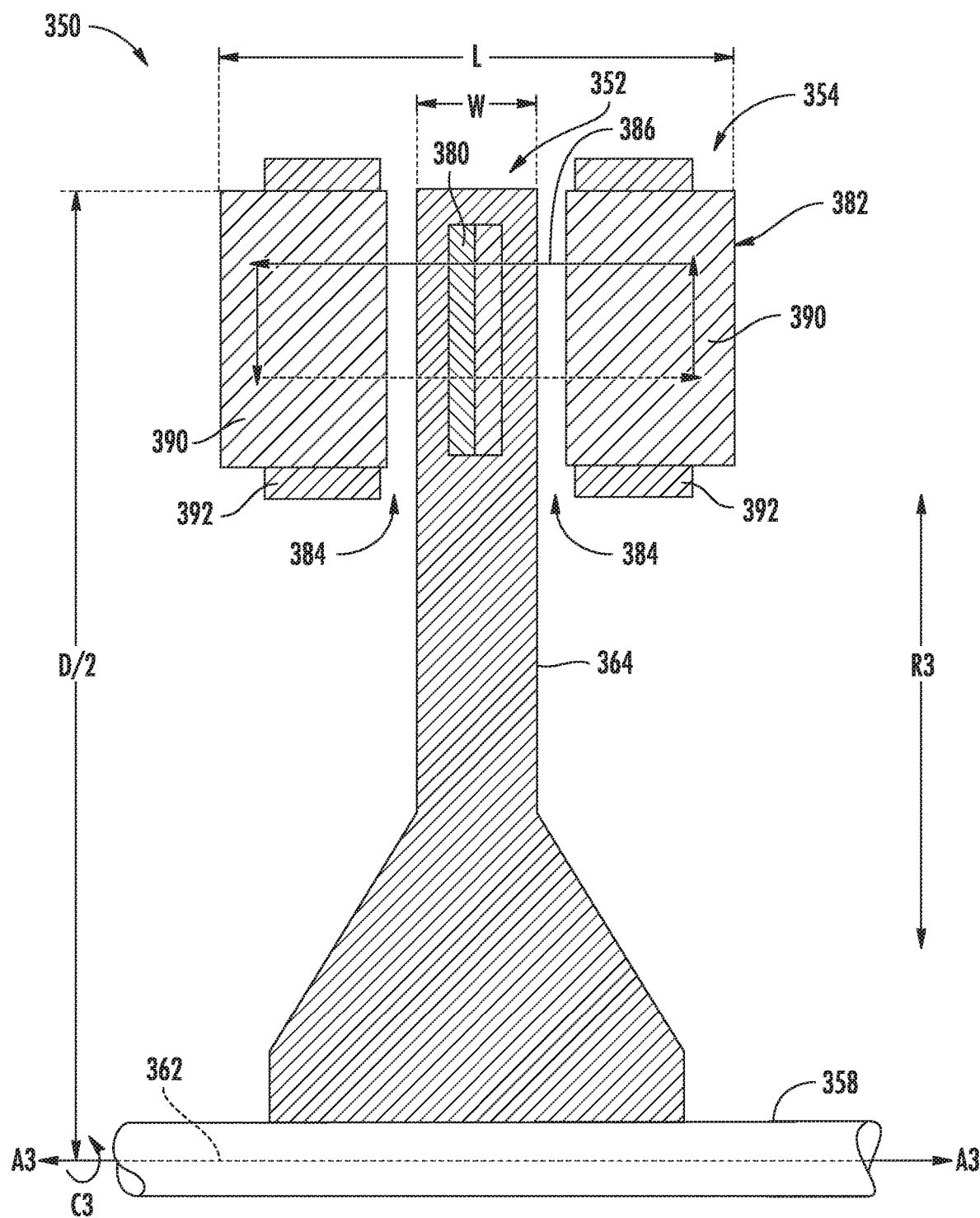
FIG. 5 is a cross-sectional view of an electric machine for the exemplary aft engine of FIG. 4 in accordance with an exemplary embodiment of the present disclosure.
Figure 6:
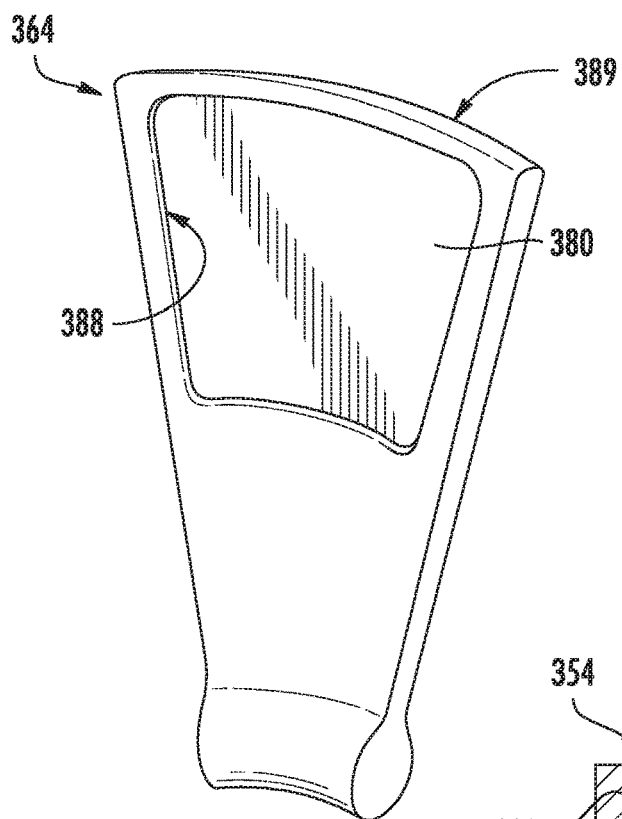
FIG. 6 is a partial perspective view of a rotor assembly of the exemplary electric machine of FIG. 5 in accordance with an exemplary embodiment of the present disclosure.
Figure 7:
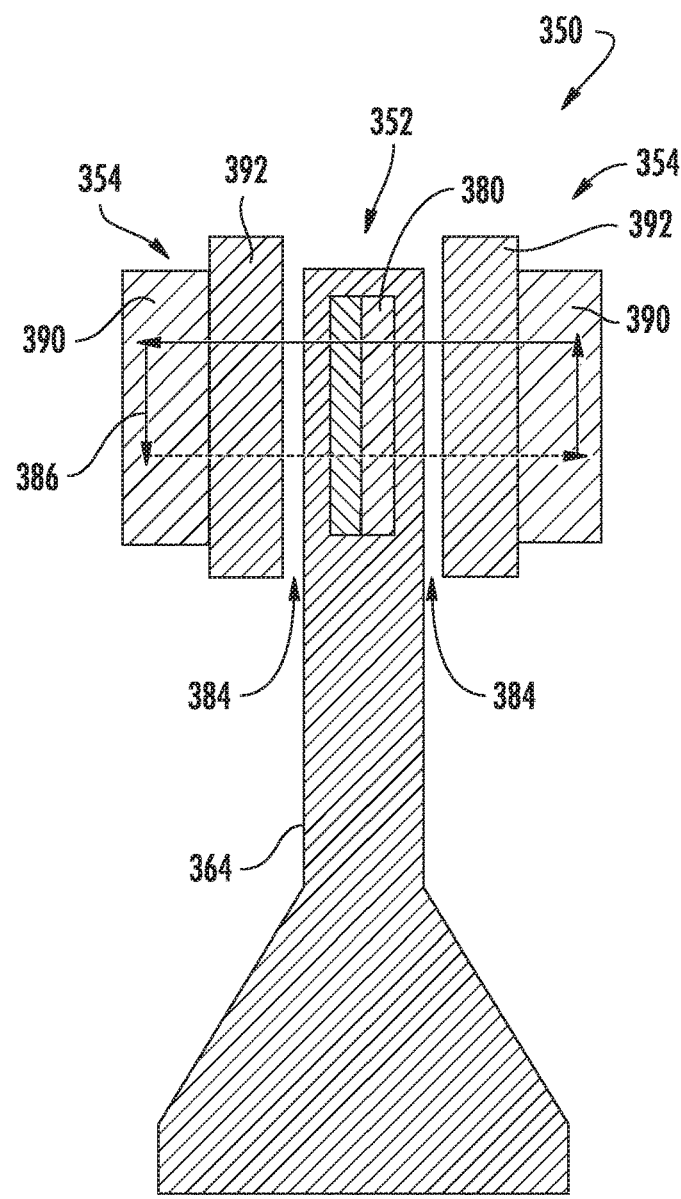
FIG. 7 is a cross-sectional view of another electric machine for the exemplary aft engine of FIG. 4 in accordance with an exemplary embodiment of the present disclosure.

Referring now to FIGS. 5 through 7, an electric machine 350 according to an exemplary embodiment of the present subject matter will be described. More specifically, FIG. 5 will provide a cross-sectional view of electric machine 350, FIG. 6 will provide a partial perspective view of a rotor assembly of electric machine 350, and FIG. 7 will provide a stator assembly according to an alternative exemplary embodiment of the present subject matter. Notably, the same or similar numbering may refer to the same or similar parts in FIGS. 5 through 7. Although described below as being configured for driving a boundary layer ingestion fan for an aircraft, it should be appreciated that in other exemplary embodiments, electric machine 350 may be used as a motor or generator for any suitable application or in any other suitable device. For example, electric machine 350 may be used as a primary or secondary power plant in a land-based vehicle (such as an automobile), in an under-wing mounted propulsion device for an aircraft, for nautical vehicles, etc.

As illustrated, electric machine 350 includes a rotor assembly 352 and a stator assembly 354, each of which will be described in detail below. Electric machine 350 defines an axial direction A3, a radial direction R3, and a circumferential direction C3 (a direction extending about the axial direction A3). According to one embodiment, electric machine 350 may be configured as electric motor 336 for driving BLI fan 300 (see FIG. 4). According to another exemplary embodiment, electric machine 350 may be configured as electric machine 246, e.g., acting as a generator mechanically coupled to fan 226 (see FIG. 3).

As illustrated in FIG. 5, electric machine 350 includes a drive shaft 358 defining a longitudinal axis 362 of electric machine 350. According to one exemplary embodiment, when electric machine 350 is installed in the BLI fan 300, longitudinal axis 362 may align with the centerline axis 302 of the BLI fan 300. Rotor assembly 352 may optionally include a plurality of bearings (not shown) on axial ends of drive shaft 358.

Referring now generally to FIGS. 5 through 7, rotor assembly 352 includes a rotor disk 364 that is mounted to and extends from drive shaft 358 substantially along the radial direction R3. In this regard, rotor disk 364 is rotatable about the axial direction A3. In an embodiment, drive shaft 358 and rotor disk 364 may be keyed so as to be in cooperative engagement. In an embodiment, drive shaft 358 may include one or more features, such as protrusions (not shown), in cooperative engagement with one or more features, such as recesses (not shown), in rotor disk 364, or vice versa. In an embodiment, drive shaft 358 may include additional features configured to provide passages for a cooling fluid (not shown) within rotor assembly 352. In a non-limiting example, the cooling fluid may be airflow or a coolant for reducing mechanical stresses and eddy current losses in the rotor assembly 352.

Still referring to FIGS. 5 through 7, according to the illustrated exemplary embodiment, rotor assembly 352 includes a plurality of rotor magnets 380. Similarly stator assembly 354 includes a plurality of stator conductors 382. Rotor magnets 380 are configured to generate a rotor magnetic field and stator conductors 382 are configured to generate a stator magnetic field. In general, the rotor magnetic field and the stator magnetic field interact to generate a torque that rotates rotor disk 364 and drive shaft 358.

Rotor magnets 380 may define a magnetization direction (i.e., a north-south pole orientation) that extends along the axial direction A3, e.g., when operating as an "axial flux" machine. For example, in the illustrated exemplary embodiment of FIGS. 5 through 7, rotor magnets 380 are configured having a magnetization or pole direction that is oriented substantially axially within the electric machine 350. As a result, stator assembly 354 is located adjacent rotor magnets 380 along the axial direction A3. In this regard, rotor magnets 380 generate a magnetic field to be axially directed between rotor assembly 352 and stator assembly 354 across an air gap 384 (as illustrated by arrows 386 in FIG. 5). As described herein, the magnetic field generated by rotor magnets 380 further interacts with a stator magnetic field produced by its armature currents to produce a torque.

It should be appreciated, however, that according to alternative embodiments, electric machine 350 may be configured as a "radial flux" machine. In a radial flux machine, rotor magnets 380 may be configured to generate a magnetic field that extends substantially along the radial direction R3 between rotor assembly 352 and stator assembly 354 across air gap 384. According to other exemplary embodiments, rotor magnets 380 may be arranged in any suitable polarity arrangement. For example, according to the illustrated embodiment, the magnetization direction of each rotor magnet extends along the axial direction A3. However, any other suitable magnetization direction or combination or magnetization directions may be used according to alternative embodiments.

Although rotor magnets 380 and stator conductors 382 are referred to generally herein as "magnets," it should be appreciated that these magnets may be any suitable magnetic material, and may be permanent magnets, electromagnets, etc. For example, according to the illustrated embodiment, rotor magnets 380 are permanent magnets and stator conductors 382 are ferromagnetic material with conductive windings In this regard, for example, rotor magnets 380 are samarium-cobalt magnets or a neodymium magnets. However, it should be appreciated that alternative embodiments may use any suitable combination of rotor magnets 380 and stator conductors 382 to generate a torque on rotor disk 364 and drive shaft 358. In addition, although stator assembly 354 is illustrated as having concentrated windings, it should be appreciated that stator assembly 354 may alternatively have distributed windings or any other suitable stator winding configuration. Furthermore, rotor magnets 380 and stator conductors 382 may include any suitable coating or covering, such as a metallic or non-metallic magnetic shielding material or retaining structure.

According to the illustrated exemplary embodiment, rotor magnets 380 are embedded within rotor disk 364. As used herein, the term "embedded" may refer to a configuration where a rotor magnet 380 is partially or wholly incorporated within the profile or the external boundary of rotor disk 364. For example, according to one exemplary embodiment, rotor magnets 380 may be entirely sealed within rotor disk 364. In this regard, for example, the entirety of each rotor magnet 380 is positioned entirely within the external boundary of rotor disk 364.

However, according to alternative embodiments, rotor magnets 380 may be partially embedded within rotor disk 364. For example, rotor disk 364 may define a recess 388 within which at least of a part of rotor magnets 380 are positioned. According to other exemplary embodiments, rotor disk 364 may define an aperture that extends through rotor disk 364 along the axial direction A3. The aperture in rotor disk 364 may be configured to receive rotor magnet 380. According to one embodiment, rotor magnet 380 and rotor disk 364 have the same width along the axial direction, such that rotor magnet 380, when embedded within rotor disk 364, sits flush with the surface of rotor disk 364.

Referring now to FIG. 6, a partial perspective view of a segment of rotor disk 364 with an embedded rotor magnet 380 is illustrated. Although FIG. 6 illustrates a single segment, it should be appreciated that rotor disk 364 may include a plurality of segments, each segment being configured for receiving one rotor magnet 380. Moreover, rotor disk 364 may be integrally formed as a single unitary part including any suitable number of segments. As illustrated, rotor magnet 380 has a trapezoidal shape and is positioned proximate a rotor tip 389. According to alternative embodiments, rotor magnet 380 may be positioned at any suitable location within rotor disk 364, and may be any suitable size and shape.

Rotor disk 364 with embedded rotor magnets 380 may be constructed using any suitably rigid material and in any suitable manner. More specifically, rotor disk 364 may be constructed of a material sufficient for withstanding the large centrifugal forces generated during high speed operation (e.g., tip speeds of 1000 feet per second or higher) of electric machine 350. Rotor disk 364 may be constructed in two symmetrical pieces, i.e., as if rotor disk 364 was split in half along a plane perpendicular to the axial direction A3. In this manner, rotor magnet 380 may be placed in one half of rotor disk and the other half may be placed over rotor magnet 380 and joined with the first half to form rotor disk 364. The two halves of rotor disk 364 may be joined using any suitable method, e.g., welding, gluing, mechanical fasteners, etc.

According to another exemplary embodiment, rotor disk 364 may be manufactured to its desired finished shape and one or more recesses may be machined within rotor disk 364 for receipt of rotor magnets 380. Rotor magnets 380 may be secured within the recesses using any suitable method, such as mechanical fasteners, glue, snap-fit mechanisms, press-fit mechanisms, etc. In addition, or alternatively, a cap piece may be positioned over rotor magnets 380 and may be joined to rotor disk 364, e.g., forming a flush surface with rotor disk 364 and sealing rotor magnets 380 within rotor disk 364.

Notably, by embedding rotor magnets 380 within rotor disk 364, rotor disk assembly 352 is designed to absorb centrifugal loads exerted on rotor magnets 380 at high speeds of operation. As such, rotor assembly 352 and thus electric machine 350 are designed to withstand high speeds and centrifugal loading. In an embodiment, rotor disk 364 is formed of a laminated magnetic metal to optimize the magnetic reluctance path and reduce eddy currents.

Rotor disk 364 may be any size suitable for supporting high speed operation of electric machine 350, e.g., by absorbing centrifugal forces of motor components such as radial stresses and hoop stresses. However, by embedding rotor magnets 380 within rotor disk 364, the overall thickness of rotor disk 364 may be decreased. For example, according to an exemplary embodiment, rotor disk 364 defines a width W measured along the axial direction A3. Using embedded rotor magnets 380, the width W of rotor disk 364 proximate rotor magnet 380 may be less than two inches. For example, according to the illustrated embodiment, the width W of rotor disk 364 proximate the embedded rotor magnet 380 is less than one inch.

Notably, a thin rotor disk 364 (i.e., a rotor disk 364 with a small width W) may enable higher tip speeds and higher specific power of electric machine 350. In this regard, electric machine 350 may define a total length L of both the rotor assembly 352 and stator assembly 354 measured along the axial direction A3. Rotor disk 364 may also define a diameter D measured along the radial direction R3. In certain exemplary embodiments, electric machine 350 may define a length to diameter (L/D) aspect ratio less than about 1.0. For example, in certain embodiments, the aspect ratio may be less than about 0.5, such as less than about 0.25 or smaller. It should be appreciated, that as used herein, terms of approximation, such as "about" or "approximately," refer to being within a 10% margin.

Stator assembly 354 generally includes stator conductors 382, which according to the illustrated embodiment, include a magnetic core 390 that is positioned in magnetic flux communication with rotor magnets 380. More specifically, magnetic core 390 may be placed axially adjacent rotor magnets 380 in an axial flux machine (i.e., FIGS. 5 through 9) and radially adjacent rotor magnets 380 in a radial flux machine (not illustrated). Magnetic core 390 may be a magnetically permeable material, e.g., metal, and may include multiple stator-slots (not shown) for receiving conductive armature windings 392. Notably, however, windings 392 are depicted as being integrated into magnetic core 390 for clarity in FIGS. 5 through 9. The armature windings 392 may include copper windings in a variety of topologies and forms. As such, stator conductors 382 may be configured as an electromagnet. In an embodiment, stator conductors 382 are configured to carry a magnetic flux optimally to and from rotor magnets 380. In addition, magnetic core 390 may be laminated directionally to reduce eddy current heating in the magnetic core 390 and thereby to improve motor efficiency.

Referring now to FIG. 7, according to an alternative embodiment, magnetic core 390 may be a solid annular block of continuous magnetic material. In such an embodiment, no stator-slots are needed and conductive armature windings 392 may be mounted directly to a surface of the magnetic core 390 using any suitable method, e.g., gluing. The magnetic core 390 and armature windings 392 could then be laminated to reduce eddy current heating in magnetic core 390 and thereby improve the efficiency of electric machine 350.

Notably, the portion of rotor assembly 352 depicted in FIG. 5 may simply be one module of the rotor assembly 352. In other embodiments, a plurality of modules may be included to provide a desired power output for the electric machine 350, with the more rotor modules included, the higher the power output.

Figure 8:
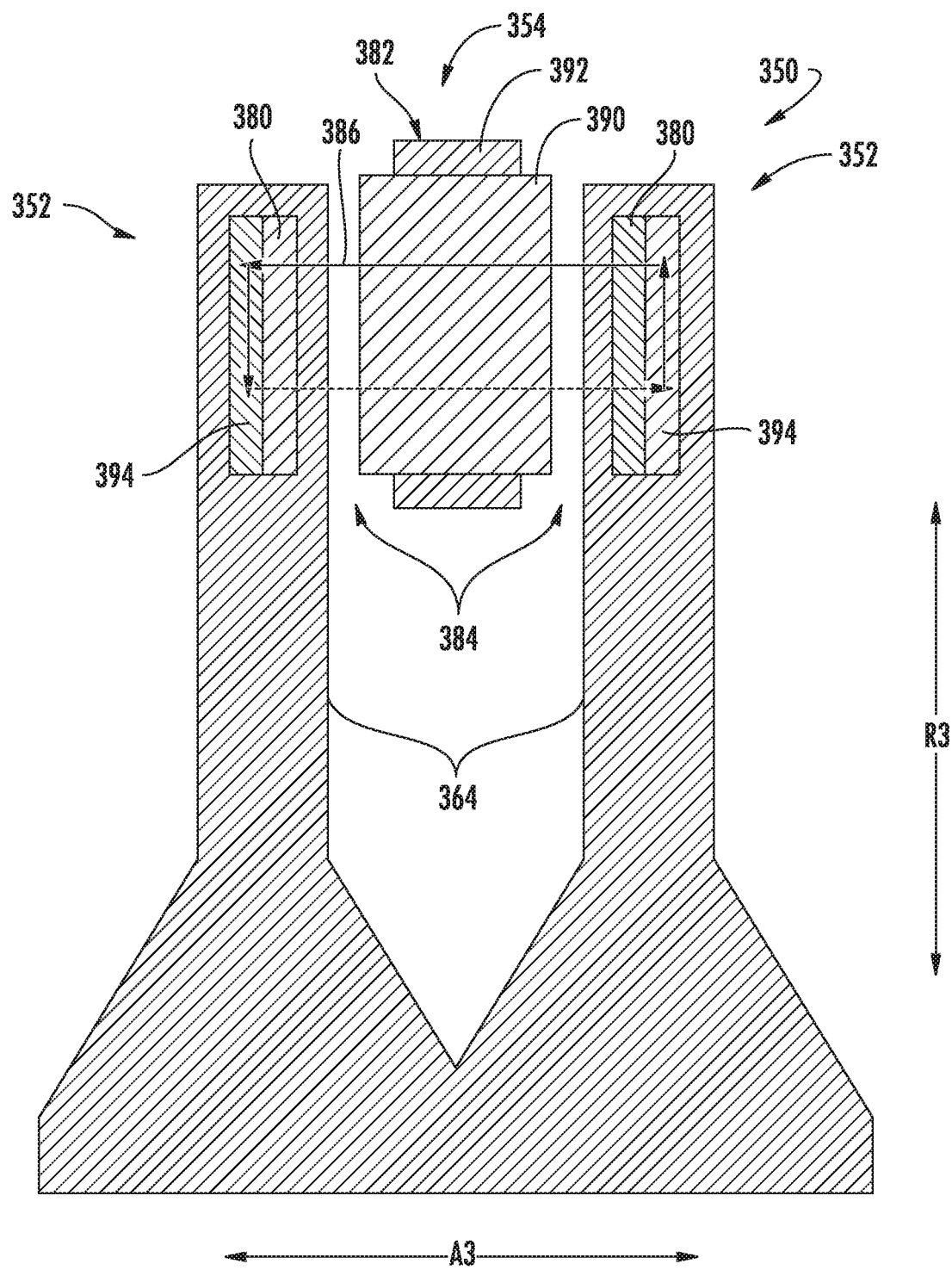
FIG. 8 is a cross-sectional view of another electric machine for the exemplary aft engine of FIG. 4, including two rotor assemblies in accordance with an exemplary embodiment of the present disclosure.

For example, referring now to FIG. 8, a cross sectional view electric machine 350 in accordance with another exemplary embodiment of the present disclosure is depicted. The exemplary rotor assembly and stator assembly may be configured in substantially the same manner as electric machine 350 depicted in FIGS. 5 through 7 and described above. Accordingly, the same or similar numbering may refer to the same or similar parts. Electric machine 350, as illustrated in FIG. 8, includes a rotor-stator-rotor configuration. In this regard, a single stator assembly 354 is positioned between two rotor assemblies 352. Notably, rotor magnet 380 may include a rotor back iron 394 for turning around the magnetic flux (as illustrated by arrows 386 in FIG. 8).

Figure 9:
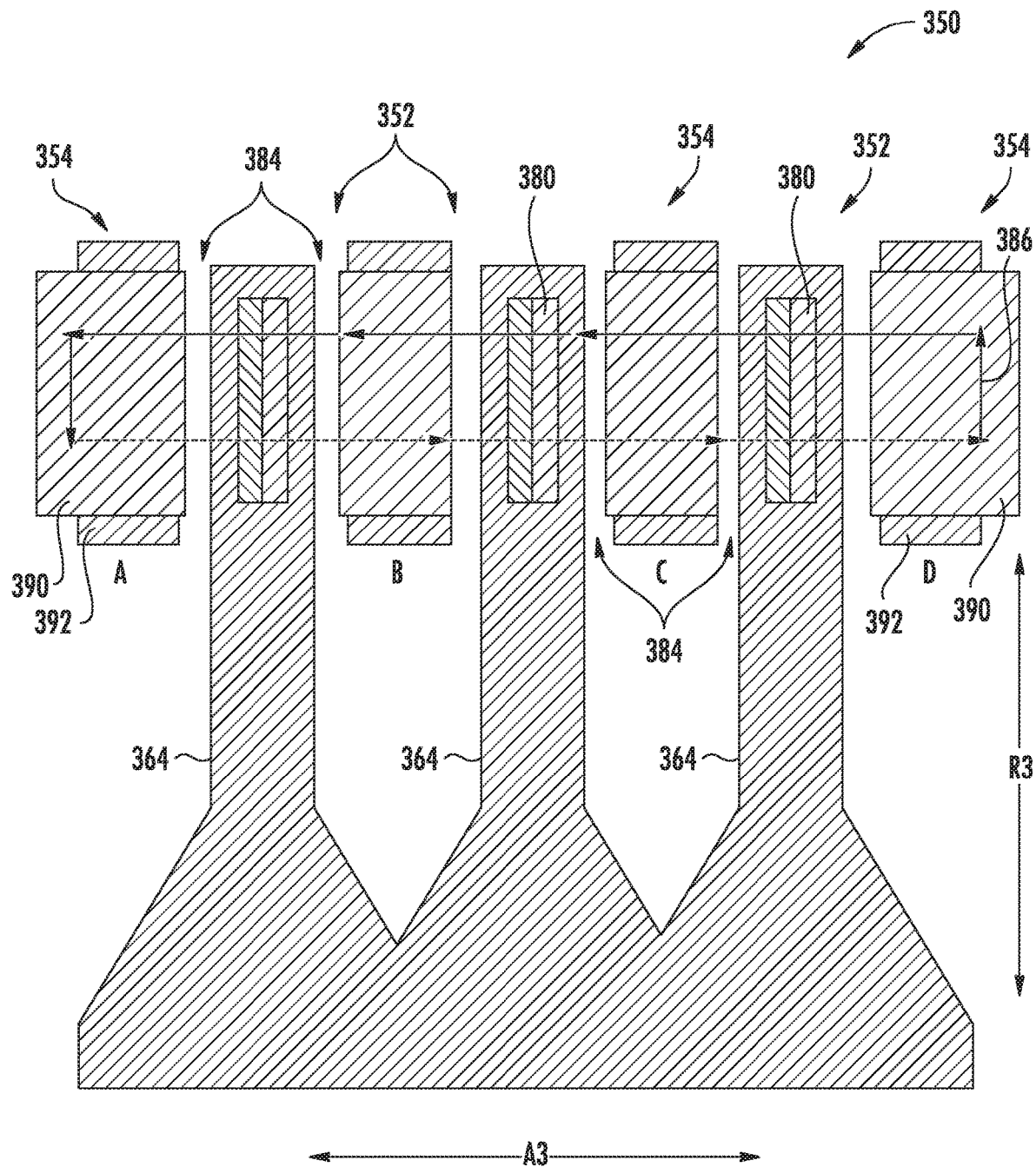
FIG. 9 is a cross-sectional view of another electric machine for the exemplary aft engine of FIG. 4, including a plurality of alternately stacked rotor and stator assemblies in accordance with an exemplary embodiment of the present disclosure.

Referring now to the exemplary embodiment of FIG. 9, a plurality of rotor assemblies 352 and a plurality of stator assemblies 354 may be alternately stacked to increase the power output of electric machine 350. According to the illustrated embodiment, three rotor assemblies 352 are positioned between four stator assemblies 354 along the axial direction A3. In this manner, magnetic flux (identified by arrow 386) may be passed from a first stator assembly 354 on one end of electric machine 350 through the rotor assemblies 352 and stator assemblies 354 along the axial direction A3. The final stator assembly 354 may turn the magnetic flux around and return it to the first stator assembly 354.

The rotor assembly 352, stator assembly 354, and the various associated components described herein are primarily configured to maximize power density and electrical performance of an electric machine. For example, electric machine 350 includes a rotor assembly 352 capable of operating at relatively high speeds, despite the high centrifugal forces and stresses exerted on rotor assembly 352 and other components of electric machine 350. For example, electric machine 350 may operate at high speeds as determined by the electric machine average airgap speed (described below). For example, electric machine 350 defines an electric machine average airgap speed during operation of electric machine 350. The electric machine average airgap speed refers to a general measure of the speed of the rotor disk 364 at airgap 384 (e.g., a surface speed or linear speed of rotor disk 364). As will be appreciated, such an average airgap speed may be calculated by multiplying a rotational speed of rotor disk 364 of electric machine 350 by an average radial centerline of airgap 384. For example, on an axial flux machine, the average radial centerline is the average radius of stator conductor 382 along the radial direction R3. For a radial flux machine, the average radial centerline is the radial center of airgap 384 along the radial direction R3. As an example, electric machine 350 may be configured to operate at electric machine tip speeds above about 750 feet per second (ft/s). More particularly, an electric machine in accordance with one or more exemplary embodiments of the present disclosure may operate during standard day, maximum speed conditions with an electric machine tip speed above about 850 feet per second (ft/s), such as above about 900 ft/s, such as above about 1,000 ft/s.

In addition, rotor assembly 352 may have a reduced overall size and may be configured for improving the utilization of magnetic flux within electric machine 350. Such a configuration allows for increased power density and improved electrical performance. Therefore, an electric machine in accordance with one or more embodiments of the present disclosure may provide for an electric machine having a desired efficiency and power density. Furthermore, the present disclosure provides additional advantages in terms of low volume, mass, and cost. These techniques and systems thus allow for an electric machine having a higher power-to-weight ratio that is more robust than prior designs. More particularly, the provided electric machine 350 as disclosed herein is capable of running at higher speeds and loads, effectively permitting a smaller machine to handle higher loads.

Figure 10:
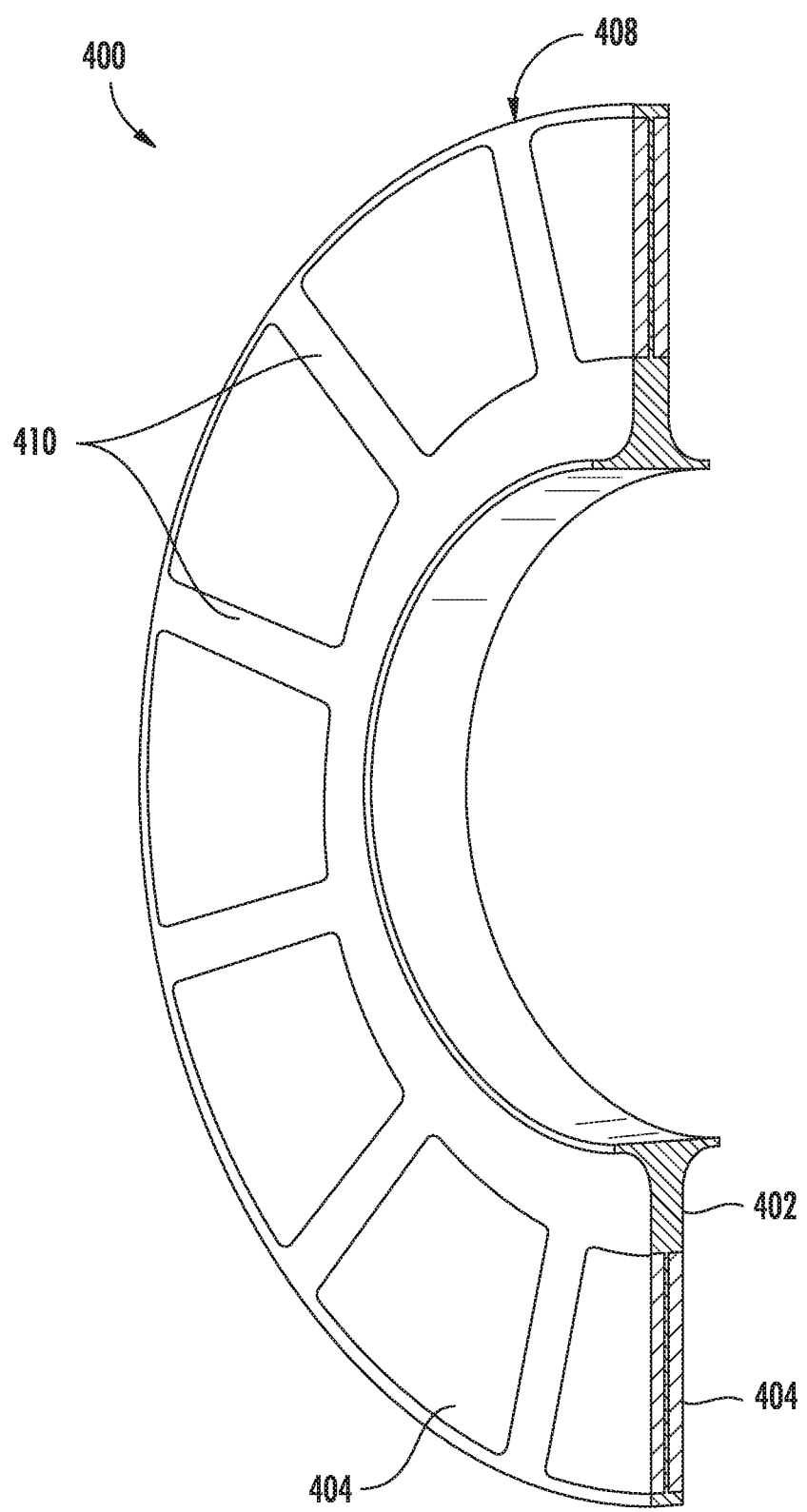
FIG. 10 is a perspective, cross-sectional view of a rotor disk of another electric machine for the exemplary aft engine of FIG. 4 according to an exemplary embodiment of the present subject matter.
Figure 11:
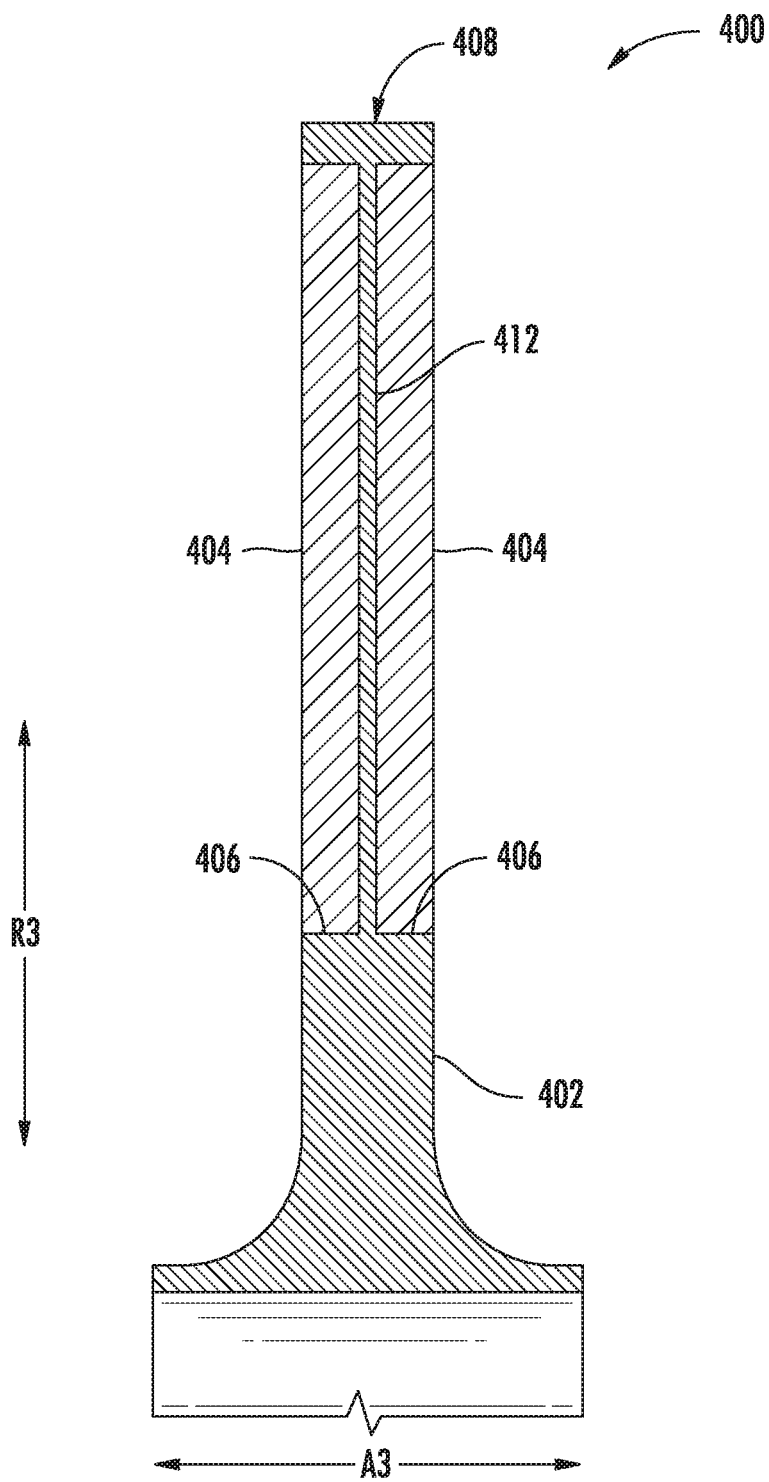
FIG. 11 is a cross-sectional view of the rotor disk of the exemplary electric machine of FIG. 10 according to an exemplary embodiment of the present subject matter.

Referring now to FIGS. 10 and 11, a rotor assembly 400 that may be used with an electric machine according to an exemplary embodiment of the present subject matter will be described. Rotor assembly 400 may be used with any suitable stator assembly and in any suitable electric machine. For example, rotor assembly 400 may be used with electric machine 350 and may interact with stator assembly 354 as a motor for generating torque from electrical energy or as a generator for generating electrical energy from torque.

Similar to the embodiments described above, rotor assembly 400 includes a rotor disk 402 that is mounted to and extends from a drive shaft (not shown) substantially along the radial direction R3. Rotor assembly 400 may further include a plurality of rotor magnets 404, which are configured to interact with stator magnets and a stator assembly to produce torque in a manner similar to that described above.

Rotor magnets 404 may define a magnetization direction (i.e., a north-south pole orientation) that extends along the axial direction A3. As a result, the stator assembly is located adjacent rotor magnets 404 along the axial direction A3. In this regard, rotor magnets 404 generate a magnetic field to be axially directed between rotor assembly 400 and the stator assembly across an air gap. Furthermore, rotor magnets 404 may include any suitable coating or covering, such as a metallic or non-metallic magnetic shielding material or retaining structure.

According to the illustrated exemplary embodiment, rotor magnets 404 are embedded within rotor disk 402. In this regard, rotor magnets 404 and the construction of rotor disk 402 may be similar to the embodiment described above with respect to FIGS. 5 through 9. For example, as best illustrated in FIG. 11, rotor disk 402 may define one or more recesses 406 within which at least a part of rotor magnets 404 are positioned. As illustrated, recesses 406 and rotor magnets 404 have a trapezoidal shape and are positioned proximate a rotor tip 408. In addition, rotor magnets 404 are spaced apart along the circumferential direction C3, such that a hub and spoke arrangement is formed for supporting centrifugal loads. More specifically, rotor magnets 406 may be spaced apart to define radially extending spokes 410 that provide additional centrifugal stiffening of rotor disk 402.

Figure 12:
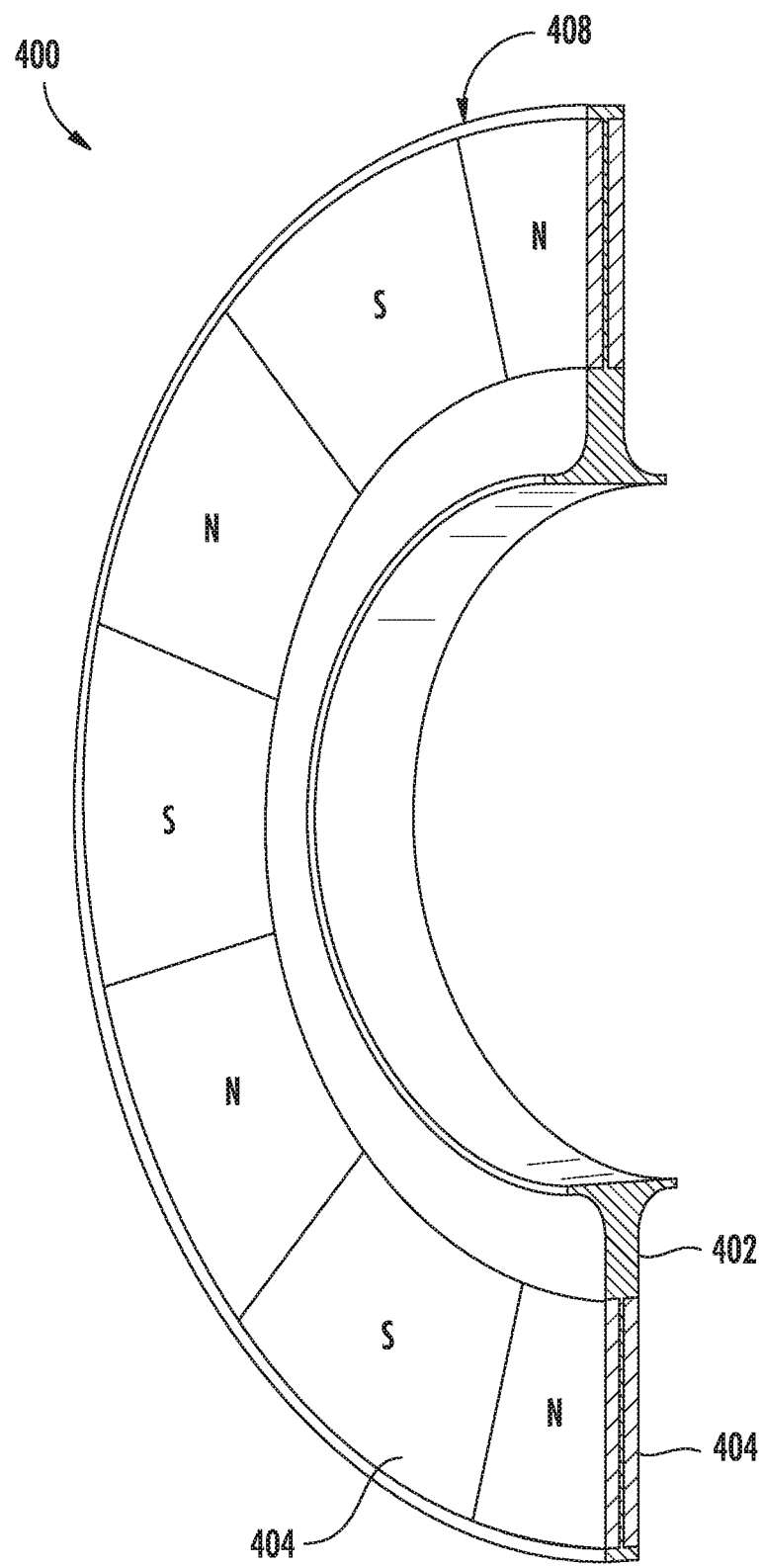
FIG. 12 is a perspective, cross-sectional view of a rotor disk having a continuous embedded magnet according to an exemplary embodiment of the present subject matter.

According to alternative embodiments, rotor magnets 404 may be positioned at any suitable location within rotor disk 402, and may be any suitable size and shape. For example, referring briefly to FIG. 12, rotor magnets 404 may be formed as a continuous magnet embedded within rotor disk 402 and extending along the circumferential direction C3. In this regard, the rotor magnets 404 have alternating polarity portions arranged along the circumferential direction C3.

Referring again to FIGS. 10 and 11, rotor disk 402 with embedded rotor magnets 404 may be constructed using any suitably rigid material and in any suitable manner. As illustrated, rotor assembly 400 may include two rotor magnets 404 separated by a web 412. Web 412 may be constructed in any suitable manner and may be any suitable material. For example, according to one embodiment, web 412 is the same material as rotor disk 402. In this regard, recesses 406 may be defined by machining out material from rotor disk 402, leaving web 412 to be positioned between rotor magnets 404. Rotor magnets 404 may be secured within recesses 406 using any suitable method, such as mechanical fasteners, glue, snap-fit mechanisms, press-fit mechanisms, etc.

According to another exemplary embodiment, web 412 may be a different material than rotor disk 402. In such an embodiment, rotor disk 402 may be a two-part disk that sandwiches web 412. Rotor disk 402 may be constructed in two symmetric or asymmetric pieces, i.e., as if rotor disk 402 was split in half along a plane perpendicular to the axial direction A3. The two halves of rotor disk 402 may be joined using any suitable method, e.g., welding, gluing, mechanical fasteners, etc. Moreover, web 412 may be ferromagnetic or non-magnetic.

In addition, according to some embodiments, rotor magnets 404 may be entirely sealed within rotor disk 402, such that rotor magnets 404 have no exposed surfaces outside rotor disk 402. In this regard, rotor disk 402 may define an additional retaining structure positioned on one or both axial ends of rotor disk 402. In this regard, the retaining structure may be positioned over rotor magnets 404 and may be joined to rotor disk 402, e.g., forming a flush surface with rotor disk 402 and sealing rotor magnets 404 within rotor disk 402. Alternatively, one or more coatings may be applied to the surface of rotor disk 402 and over rotor magnets 404, e.g., to assist in the transfer of magnetic flux, to reduce corrosion, to provide axial retention force to rotor magnets 404, or for any other suitable purpose. Alternatively, rotor magnets may be only partially embedded, such that some surface of rotor magnets 404 are exposed outside rotor disk 402.

Notably, by embedding rotor magnets 404 within rotor disk 402, rotor disk assembly 400 is designed to absorb centrifugal loads exerted on rotor magnets 404 at high speeds of operation. As such, rotor assembly 400 and thus electric machine 350 are designed to withstand high speeds and centrifugal loading.

It should be appreciated, however, that the exemplary electric machine 350 described above with reference to FIGS. 5 through 12 may alternatively be configured in any other suitable manner. For example, in other exemplary embodiments, electric machine 350 may be configured in accordance with one or more of the exemplary embodiments described in U.S. patent application Ser. No. 14/317,294 (published at the time of filing as United States Patent Publication Number 2015/0380999), which is incorporated herein fully by reference for all purposes. For example, although electric machine 350 illustrated herein is configured as an "outrunner" motor, it should be appreciated that electric machine 350 could also be configured as an "inrunner" electric machine while remaining within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine defining an axial direction, a radial direction, and a circumferential direction, the electric machine comprising:
   a stator assembly; and
   a rotor disk rotatable about the axial direction relative to the stator assembly, the rotor disk comprising a plurality rotor magnets embedded therein, wherein the rotor magnets include a continuous magnet embedded within the rotor disk and extending along the circumferential direction, wherein the continuous magnet comprises alternating polarity portions arranged along the circumferential direction, the rotor magnets being operable with the stator assembly to produce a torque, the rotor magnets being spaced from the stator assembly along the axial direction of the electric machine to generate an axial flux across an airgap.

2. The electric machine of claim 1, wherein at least some of the rotor magnets are spaced apart along the circumferential direction.

3. The electric machine of claim 1, wherein the stator assembly comprises a magnetic core that is a solid annular block of continuous magnetic material, and wherein a conductive winding is mounted to a surface of the magnetic core.

4. The electric machine of claim 1, wherein the rotor magnets are completely sealed within the rotor disk.

5. The electric machine of claim 1, wherein the electric machine defines a length along the axial direction and a diameter along the radial direction, and wherein the electric machine has a ratio of the length to the diameter of less than 0.5.

6. The electric machine of claim 1, wherein the electric machine comprises a plurality of rotor disks and a plurality of stator assemblies, the rotor disks and the stator assemblies being alternately stacked together along the axial direction.

7. The electric machine of claim 1, wherein the electric machine is configured to operate at a rotor tip speed of greater than 700 feet per second.

8. The electric machine of claim 1, wherein the rotor disk defines a width measured along the axial direction, and wherein the width of the rotor disk proximate the embedded rotor magnets is less than one inch.

9. The electric machine of claim 1, wherein the rotor disk defines a rotor tip, and wherein the rotor magnets are embedded within the rotor disk proximate the rotor tip.

10. The electric machine of claim 1, wherein the rotor disk is formed of a non-magnetic metal material.

11. The electric machine of claim 1, wherein each of the rotor magnets sits flush with a surface of the rotor disk on both axial sides of the rotor disk.

12. The electric machine of claim 1, wherein the rotor disk defines a disk width measured along the axial direction and the rotor magnets define a magnet width measured along the axial direction, the magnet width being equivalent to the disk width.

13. An electric machine configured for driving an aeronautical propulsion device for an aircraft, the electric machine comprising:
    a drive shaft mechanically coupled to the aeronautical propulsion device and defining an axial direction and a radial direction;
    a rotor disk mounted to the drive shaft and being rotatable about the axial direction;
    a plurality of rotor magnets embedded within the rotor disk, wherein the rotor magnets include a continuous magnet embedded within the rotor disk and extending along the circumferential direction, wherein the continuous magnet comprises alternating polarity portions arranged along the circumferential direction; and
    a stator assembly operable with the rotor magnets to produce a torque.

14. The electric machine of claim 13, wherein a north-south pole orientation of the rotor magnets extends along the axial direction such that an axial magnetic flux is generated, and wherein the stator assembly is located adjacent the rotor magnets along the axial direction.

15. The electric machine of claim 13, wherein the electric machine defines a length along the axial direction and a diameter along the radial direction, and wherein the electric machine has a ratio of the length to the diameter of less than 0.5.

16. The electric machine of claim 13, wherein the disk width proximate the embedded rotor magnets is less than one inch.

17. The electric machine of claim 13, wherein each of the plurality of rotor magnets is positioned entirely within an external boundary of the rotor disk.

18. An electric machine defining an axial direction, a radial direction, and a circumferential direction, the electric machine comprising:
    a stator assembly; and
    a rotor disk being rotatable about the axial direction relative to the stator assembly, the rotor disk extending to a position adjacent to the stator assembly along the axial direction or outward of the stator assembly along the radial direction, the rotor disk comprising a plurality of rotor magnets embedded therein, wherein the rotor magnets include a continuous magnet embedded within the rotor disk and extending along the circumferential direction, wherein the continuous magnet comprises alternating polarity portions arranged along the circumferential direction, the rotor magnets being operable with the stator assembly to produce a torque.

19. The electric machine of claim 18, wherein the electric machine defines a length along the axial direction and a diameter along the radial direction, and wherein the electric machine has a ratio of the length to the diameter of less than 0.5.

20. The electric machine of claim 18, wherein the rotor disk defines a width measured along the axial direction, and wherein the width of the rotor disk proximate the embedded rotor magnets is less than one inch.

* * * * *